United States Patent [19]

Cornwell et al.

[11] Patent Number: 5,537,752
[45] Date of Patent: Jul. 23, 1996

[54] METHOD AND APPARATUS FOR DIRECTING COMMUNITY RESPONSE TO HAZARDOUS MATERIAL RELEASE

[75] Inventors: John B. Cornwell; Jeffrey D. Marx; Terry R. Elms, all of Norman, Okla.

[73] Assignee: Quest Consultants Inc., Norman, Okla.

[21] Appl. No.: 411,535

[22] Filed: Mar. 28, 1995

[51] Int. Cl.[6] ............................................ G01B 3/12
[52] U.S. Cl. ........................ 33/1 SB; 33/1 SD; 434/218
[58] Field of Search ............................. 33/1 A, 1 B, 1 G, 33/1 SB, 1 SD, 562, 701; 434/150, 151, 218, 366, 428; 40/495; 235/61 GM, 88 R, 78 R, 89 R

[56] References Cited

U.S. PATENT DOCUMENTS

| | | | |
|---|---|---|---|
| 1,546,928 | 7/1925 | Graham | 434/150 |
| 2,407,893 | 9/1946 | Meyer | 33/1 |
| 2,415,277 | 2/1947 | Caston | 33/80 |
| 3,289,334 | 12/1966 | Forest | 40/495 |
| 3,483,621 | 12/1969 | Balhorn et al. | 33/1 |
| 3,621,578 | 11/1971 | Novakovic | 33/1 SB |
| 4,138,817 | 2/1979 | Frost et al. | 33/1 SD |
| 4,149,316 | 4/1979 | Martin | 33/1 SD |
| 4,344,231 | 8/1982 | Martinez | 33/1 G |
| 4,516,013 | 5/1985 | Hester | 235/88 R |
| 4,606,127 | 8/1986 | Task et al. | 33/15 |
| 4,835,870 | 6/1989 | Rauch et al. | 33/1 C |
| 5,167,076 | 12/1992 | Sump | 33/1 SD |
| 5,214,855 | 6/1993 | Gibbs | 33/1 SD |
| 5,408,753 | 4/1995 | Hong | 33/562 |

*Primary Examiner*—William A. Cuchlinski, Jr.
*Assistant Examiner*—G. Bradley Bennett
*Attorney, Agent, or Firm*—Robert Treece

[57] ABSTRACT

The present invention provides an apparatus for determining and directing community response to a material release, such as a hazardous gas release. The apparatus includes a map with a rotatable warning indicator attached thereto.

The warning indicator has one or more warning areas marked thereon and preferably color coded. The warning indicator also includes at least one wind direction indicator which may be aligned with a heading on the map which corresponds to the actual wind condition. When so aligned the warning areas highlight the geographical area on the map where a community response is suggested and recommends what first response precautions should be taken.

18 Claims, 3 Drawing Sheets

METHOD AND APPARATUS FOR DIRECTING COMMUNITY RESPONSE TO HAZARDOUS MATERIAL RELEASE

FIELD OF THE INVENTION

The present invention relates to methods and apparatuses for directing the initial community response when a release of hazardous material occurs.

SUMMARY OF THE INVENTION

In thousands, if not millions of locations around the world chemicals and materials are produced, manufactured, processed, consumed, used, handled or stored. Some of these materials pose no public health concern, but others are hazardous and have the potential for harming or even killing individuals should they be released into the environment. If an accident occurs where hazardous materials are released, public servants need to take the proper precautions to avoid injury, panic or confusion. However, information currently available to public servants or even officials at hazardous materials facilities, about the proper response to take is time consuming to obtain, and often difficult to interpret.

Some information is available from books or manuals, but specifics are often difficult to locate and interpret, and are seldom if ever tailored for a specific geographical location. Although much better information is available through the use of computer programs which can analyze the specifics of a given situation, this may require precious minutes to retrieve. Another difficulty with the sources of information currently available is that they are bulky or simply not available to the police or firemen responding to an accident. Such information is usually located at or near the hazardous material facility, where individuals may be hesitant to remain during the first few minutes after an accident or spill.

While the detailed information which may be provided from a custom computer program is very important, a quick, easy to interpret, immediate response guide is essential. The current invention provides such a response guide. The invention is small and easy to transport, may be provided to fire departments or police near a hazardous materials facility, as well as to officials at a hazardous materials facility. The information in the response guide is easy to interpret even in the chaos which may occur in the first minutes following an accident. The guide provides individuals with the information necessary to act if it is required, or to inform the public when no action is required.

Other advantages of the current invention will become apparent when the following descriptions are read in conjunction with the accompanying drawings.

BRIEF DESCRIPTION OF THE DRAWINGS

FIG. 3 is a top view of a warning indicator having warning areas printed thereon.

DETAILED DESCRIPTION OF THE PREFERRED EMBODIMENTS

Figure 1:
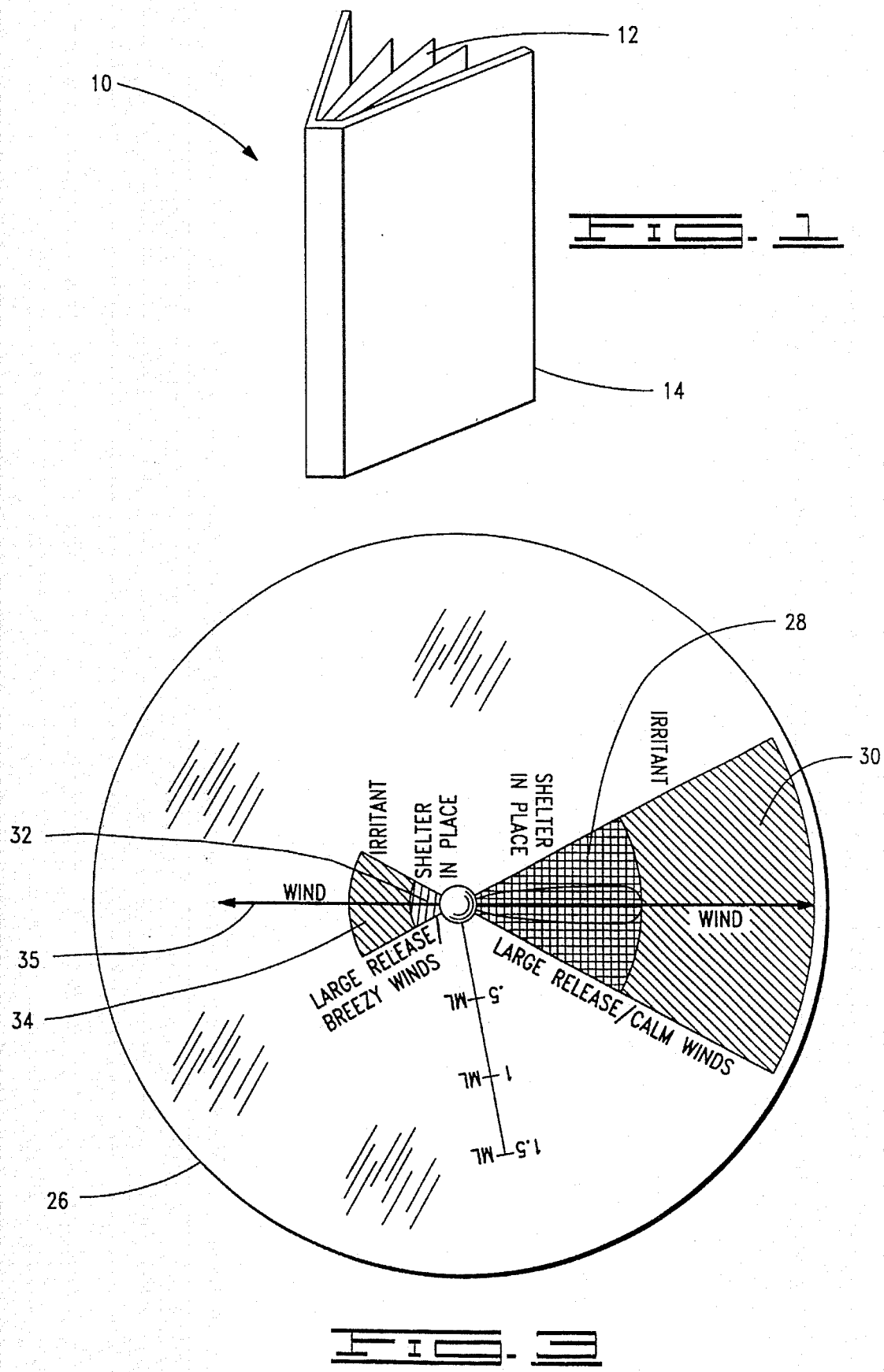
FIG. 1 is a perspective view of the apparatus constructed in accordance with the present invention.

Referring to the drawings in detail and to FIG. 1 in particular, reference character 10 generally designates an apparatus for directing community response to a hazardous material release constructed in accordance with the present invention. The apparatus preferably includes one or more response cards 12 tailored for a specific containment location 13 FIG.2, such as a chemical plant. In the most preferred embodiment, the cards are arranged and stored in a card holder. Some acceptable holders include spiral, comb, and ring binders. The most preferred holder is a ring binder, such as the three ring note book 14. In this way, response cards may be easily added or removed.

Figure 2:
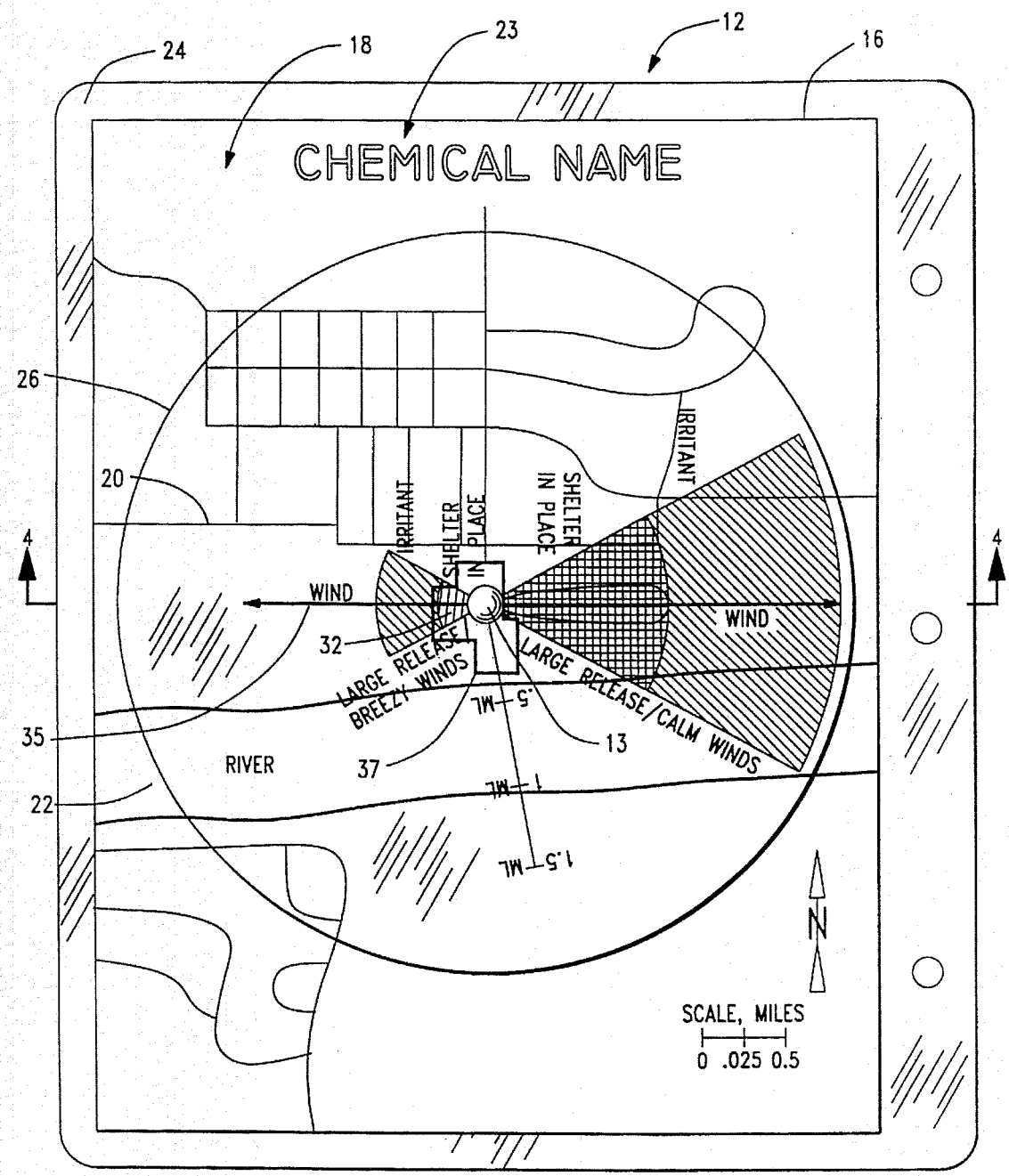
FIG. 2 is a bottom view of a substrate having a map printed thereon and with a warning indicator attached to the substrate.

Referring now to FIG. 2, a response card 12 is shown in more detail. The response card 12 preferably includes a substrate 16, such as cardboard, paper, plastic, or other material with a map 18 printed thereon. Preferably the map 18 is a scale map and shows the major features of the geographical area around a location where hazardous materials are contained. The map 18 should include the names of major thoroughfares (such as road 20) and other significant landmarks (such as river 22). In the most preferred embodiment, locations such as schools, daycares, large office buildings and the like are depicted on the map 18. It is also preferable to have the chemical name 23 for which the specific response card 12 is designed located on the map side of the substrate 16. This may be accomplished by printing the chemical name 23 on the substrate 16 or on a laminate which covers the substrate. Preferably, the chemical name 23 is printed so that it which does not obscure features on the map.

If the map 18 is printed on a substrate 16 which is easily damaged by a liquid such as water, then the substrate 16 should be protected by a covering such as by a laminate like clear laminate 24. In any case, the printing of the map 18 should be with a resistant ink or the ink should be protected to prevent blurring, bleeding or otherwise obscuring the features displayed on the map.

Figure 5:
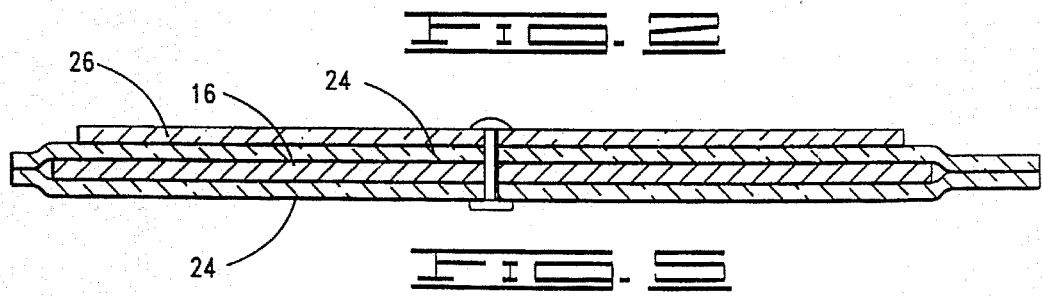
FIG. 5 is a cross section of the apparatus constructed in accordance with the present invention.

As is shown in FIGS. 2, 3 and 5 a warning indicator 26 is pivotally attached to the substrate 16. The attachment point for the warning indicator 26 is preferably at the location on the map 18 where the hazardous materials are contained. Preferably, the warning indicator 26 is a transparent wheel, made of plastic or a similar material, however other shapes and materials may also be used. Warning areas, such as areas 28, 30, 32 and 34, may then be indicated by having portions of the warning indicator 26 in different colors. When a transparent material is used for the warning indicator 26, this may be accomplished by printing on the transparent material or by forming or attaching material of a different color into the warning indicator 26. One other suitable type of warning indicator may be a non-transparent or translucent material, with the warning areas indicated by openings in the warning indicator or by more (or less) transparent areas in the indictor.

The size and shape of a particular warning area should be determined by a study of the geographical location, type of material contained, wind conditions and other relevant information. Such studies are commercially available and one provider of a study of this type is QUEST CONSULTANTS INC.,™ of Norman, Okla. The warning indicator in FIGS. 2 and 3 show four different warning areas, two for large releases in calm winds and two for large releases in breezy winds. It should be noted that in the preferred embodiment the number of warning areas may be more or less. The preferred number of warning areas being generally determined by the type of material for which the particular response card is designed. Some material releases may require different responses for large releases and small releases as well as for calm winds or breezy conditions. In addition, separate responses may be suggested depending on the distance from the release point. For example, the warning indicator in FIG. 3 has warning area 28 for a large release in clam winds where the suggested community response is to shelter in place; in the warning area 30, also for a large release in calm winds where no community response is suggested, but the area is marked where the release would be an irritant. Warning areas 32 and 34 similarly indicate responses or information when the release is large and the winds are breezy. If a study of the material and conditions so warrant, additional warning areas could be added, such as for small releases. Similarly additional ranges of suggested responses could be added, such as for evacuation.

The warning indicator 26 should also include wind direction indicators such as arrow 35. The arrow 35 allows the warning indicator to be aligned on the map so that the warning area identifies the geographical area where action may be warranted. For example, the indicator in FIG. 2 is properly aligned for a large release in breezy winds when the actual wind direction is from east to west. In this example, the warning area 32 suggests that individuals on the hazardous materials facility grounds 37 to the west of the release should be sheltered in place.

Figure 4:
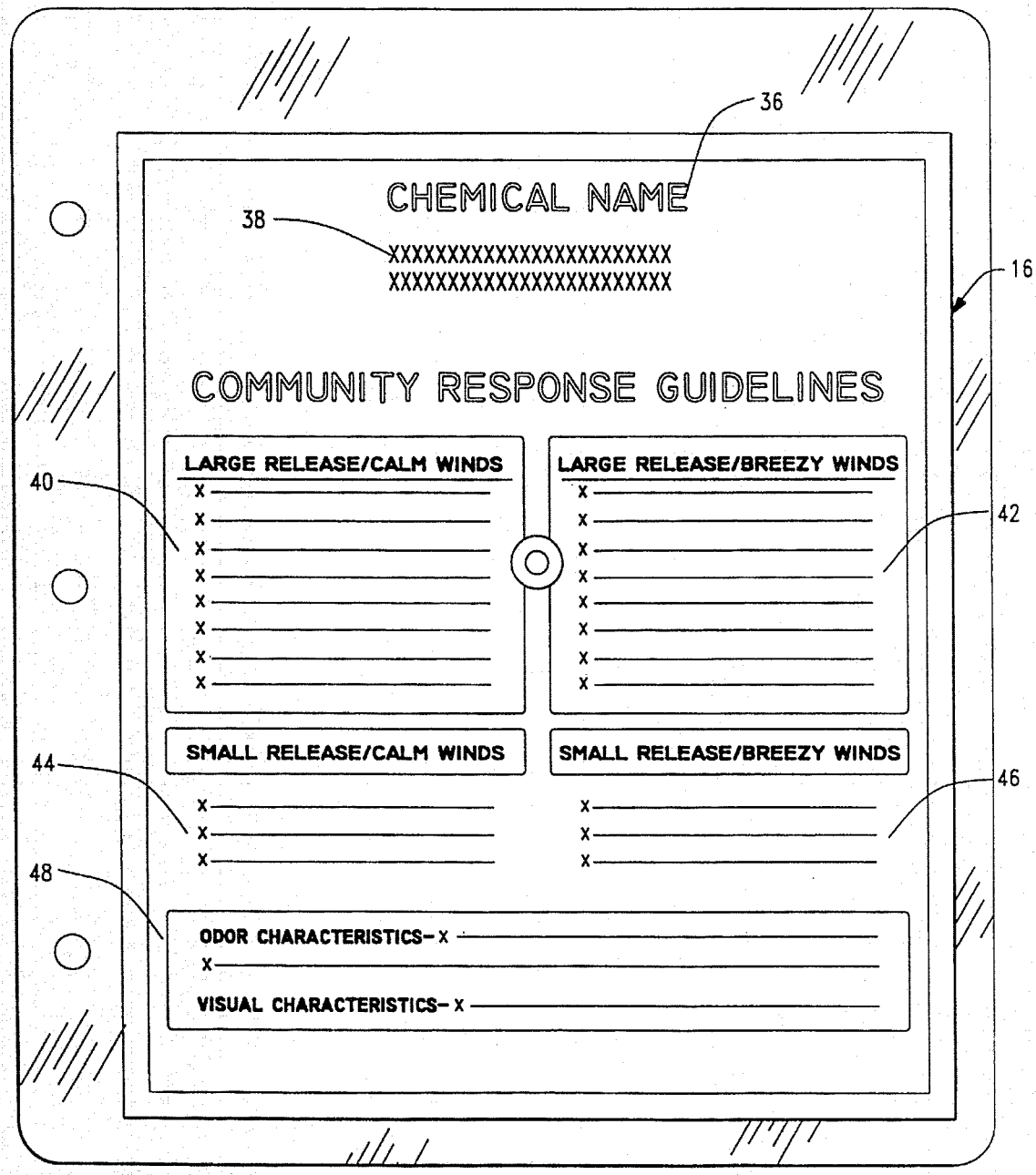
FIG. 4 is a top view of a substrate having response guidelines printed thereon.

In the preferred embodiment, the substrate 16 would include additional written guidelines and information. As shown in FIG. 4, the top of the substrate may be printed with such information. Preferably this information would include the chemical name 36, location 38 (such as XYZ Chemical Plant, Timbukto, America), written instructions 40, 42, 44 and 46 for different release amounts and wind conditions, and identifying characteristics of the material 48.

The written instructions 40, 42, 44, and 46 may include suggestions such as: advise citizens to stay indoors for X minutes; close Highway Y; restrict access to hazardous materials facility; etc. The written instructions may also include other notes such as "potential odor complaints for as far away as Y to Z miles,", or other similar information which will aid officials in understanding and responding to a hazardous material release. In the preferred embodiment the written instructions are color coded to match the warning areas on the warning indicator. For example, if warning area 32 is highlighted or tinted with the color red, then preferably warning instructions 42 would also be highlighted or tinted with the color red.

The written instructions shown in FIG. 4 show the instructions 40 and 42 in a box and the instructions 44 and 46 not in a box. This arrangement is preferred because this particular response card is designed for a material where no immediate community response is suggested for a small release. If the response card is for a material where response is suggested for a small release, then instructions 44 and 46 would preferably also be in a box and the instructions should be color coded to match warning areas on the warning indicator.

Preferably, the characteristics portion 48 of the information includes information which will allow officials to confirm or identify the material released. Some possible characteristics include the odor of the material such as "fishy odor," as well as visual characteristics such as "billowing white cloud."

When a material escapes from containment, a hazardous materials facility official may call the appropriate public servient (be it the police, fire department or other), and inform them: (a) a leak has occurred; (b) the relative size of the leak (e.g. small or large); and (c) the chemical name of the leaking material. With this information the public official may select the appropriate response card from a collection of cards for the specific location. After locating the card, the public official may read the suggested community response guidelines to determine what action, if any, is necessary. After determining what action may be necessary the public official may turn the card over and simply rotate the wheel so the appropriate wind indicator aligns with the actual wind direction. The specific geographical area within the warning area will then be identified. Having done this, the public official has all the information necessary to initiate the appropriate immediate response. Then, when available, more detailed information may be obtained from other sources.

Changes may be made in the combinations, operations and arrangements of the various parts and elements described herein without departing from the spirit and scope of the invention as defined in the following claims.

We claim:

1. An apparatus for directing community response to a hazardous material release comprising:

a map printed on a substrate wherein the map depicts an area surrounding a material containment location;

a warning indicator rotatably attached to the substrate; and one or more wind direction indicators on the warning indicator so the wind direction indicator may be aligned on the map to correspond with actual wind direction and when said wind direction indicator is so aligned the warning indicator identifies a portion or portions of the map where community response is suggested.

2. The apparatus of claim 1 wherein the warning indicator is a transparency with one or more warning areas printed thereon.

3. The apparatus of claim 2 wherein the warning areas are color coded.

4. The apparatus of claim 3 wherein the color coding of the warning areas correspond with written color coded response suggestions printed on the apparatus.

5. The apparatus of claim 4 wherein the substrate has a rear side and a front side and wherein the map is printed on the rear side of the substrate and the color coded response suggestions are printed on the front side of the substrate.

6. The apparatus of claim 5 wherein characteristics for a particular chemical are printed on the substrate.

7. The apparatus of claim 2 wherein the transparency includes at least one warning area for large releases and at least one warning area for a small releases.

8. The apparatus of claim 2 wherein the transparency includes a warning area for calm winds and a warning area for breezy winds.

9. The apparatus of claim 2 wherein the transparency includes at least one warning area for large releases.

10. The apparatus of claim 2 wherein the transparency includes at least one warning area for calm winds.

11. The apparatus of claim 2 wherein the map is a scale map.

12. The apparatus of claim 2 wherein the transparency includes one or more distance markings to indicate the distance from a material containment location.

13. The apparatus of claim 1 wherein the substrate is water resistant.

14. The apparatus of claim 1 wherein the substrate paper and a laminate is applied over the substrate.

15. An apparatus for directing community response to a material release comprising a collection of community response cards wherein each response card comprises:

a map printed on a substrate wherein the map depicts the area surrounding a material containment location;

a warning indicator rotatably attached to the substrate; and one or more wind direction indicators on the warning indicator so the wind direction indicator may be aligned on the map to correspond with actual wind direction and when said wind direction indicator is so aligned the warning indicator identifies a portion or portions of the map where community response is suggested.

16. The apparatus of claim 15 wherein the collection of community response cards are contained in a notebook.

17. The apparatus of claim 15 wherein the warning areas are color coded to correspond with written response suggestions printed on the substrate.

18. Method for responding to a material release comprising:

selecting a community response card from a collection of response cards wherein the selected community response card has: a map which depicts the area surrounding a material containment location; and a warning indicator having at least one wind direction indicator, the warning indicator being movably attached to the map;

reading a suggested response from the community response card; and aligning the wind direction indicator with a direction on the map which corresponds with the actual wind conditions to determine the area indicated by the warning indicator to require community response.

* * * * *